(12) United States Patent
Hendry et al.

(10) Patent No.: US 8,692,833 B2
(45) Date of Patent: Apr. 8, 2014

(54) LOW-POWER GPU STATES FOR REDUCING POWER CONSUMPTION

(75) Inventors: Ian C. Hendry, San Jose, CA (US); Rajabali M. Koduri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 13/206,374

(22) Filed: Aug. 9, 2011

(65) Prior Publication Data

US 2013/0038615 A1 Feb. 14, 2013

(51) Int. Cl.
*G06F 15/16* (2006.01)
*G06F 15/00* (2006.01)
*G06T 1/00* (2006.01)

(52) U.S. Cl.
USPC .......................................... 345/502; 345/501

(58) Field of Classification Search
USPC .................... 345/501, 502, 545, 541
See application file for complete search history.

(56) References Cited

U.S. PATENT DOCUMENTS

| 7,545,381 | B2 * | 6/2009 | Huang et al. | 345/522 |
|---|---|---|---|---|
| 7,698,579 | B2 * | 4/2010 | Hendry et al. | 713/300 |
| 8,199,155 | B2 * | 6/2012 | Leroy et al. | 345/502 |
| 2006/0119603 | A1 * | 6/2006 | Chen et al. | 345/502 |
| 2007/0103477 | A1 * | 5/2007 | Paquette et al. | 345/545 |
| 2008/0030509 | A1 * | 2/2008 | Conroy et al. | 345/502 |
| 2008/0204460 | A1 * | 8/2008 | Marinkovic et al. | 345/502 |
| 2009/0153540 | A1 * | 6/2009 | Blinzer et al. | 345/212 |
| 2011/0164046 | A1 * | 7/2011 | Niederauer et al. | 345/503 |

* cited by examiner

*Primary Examiner* — Jacinta M Crawford
(74) *Attorney, Agent, or Firm* — Park, Vaughan, Fleming & Dowler LLP; Chia-Hsin Suen (57) ABSTRACT

The disclosed embodiments provide a system that drives a display from a computer system. During operation, the system detects an idle state in a first graphics-processing unit (GPU) used to drive the display. During the idle state, the system switches from using the first GPU to using a second GPU to drive the display and places the first GPU into a low-power state, wherein the low-power state reduces a power consumption of the computer system.

25 Claims, 6 Drawing Sheets

LOW-POWER GPU STATES FOR REDUCING POWER CONSUMPTION

BACKGROUND

1. Field

The present embodiments relate to techniques for driving a display from a computer system. More specifically, the disclosed embodiments relate to techniques for reducing power consumption in the computer system by driving the display from a low-power GPU and placing a high-power GPU in a low-power state while the high-power GPU is in an idle state.

2. Related Art

Computer systems are beginning to incorporate high-resolution, high-power graphics technology. Rapid developments in this area have led to significant advances in 2D and 3D graphics technology, providing users with increasingly sophisticated visual experiences in domains ranging from graphical user interfaces to realistic gaming environments. Underlying many of these improvements is the development of dedicated graphics-rendering devices, or graphics-processing units (GPUs). A typical GPU includes a highly parallel structure that efficiently manipulates graphical objects by rapidly performing a series of primitive operations and displaying the resulting images on graphical displays.

Unfortunately, there are costs associated with these increased graphics capabilities. In particular, an increase in graphics performance is typically accompanied by a corresponding increase in power consumption. Consequently, many computer systems and portable electronic devices may devote a significant amount of their power to support high-performance GPUs, which may cause heat dissipation problems and decrease battery life.

One solution to this problem is to save power during low-activity periods by switching between a high-power GPU that provides higher performance and a low-power GPU with better power consumption. However, applications that use the high-power GPU may prevent a switch to the low-power GPU, even during idle periods in which graphics processing is not performed on the high-power GPU.

Hence, what is needed is a mechanism for reducing power consumption by switching from a high-power GPU to a low-power GPU during an idle state of the high-power GPU.

SUMMARY

The disclosed embodiments provide a system that drives a display from a computer system. During operation, the system detects an idle state in a first graphics-processing unit (GPU) used to drive the display. During the idle state, the system switches from using the first GPU to using a second GPU to drive the display and places the first GPU into a low-power state, wherein the low-power state reduces a power consumption of the computer system.

In some embodiments, placing the first GPU into the low-power state involves powering off the first GPU and an interface with the first GPU, and maintaining power to video memory of the first GPU.

In some embodiments, the system also intercepts graphics calls to the first GPU during the low-power state. If a graphics call to the first GPU is received, the system restores the first GPU from the low-power state, switches from using the second GPU to using the first GPU to drive the display, and directs the graphics call to the first GPU.

In some embodiments, intercepting graphics calls to the first GPU involves acquiring a lock for a first graphics call to the first GPU, and queuing the first graphics call and subsequent graphics calls to the first GPU.

In some embodiments, the system also saves a GPU configuration state of the first GPU in video memory of the first GPU prior to placing the first GPU into the low-power state. The system then restores the first GPU from the low-power state by restoring the GPU configuration state from the video memory.

In some embodiments, the system also saves an interface configuration state of the interface in memory on the computer system prior to placing the first GPU into the low-power state. The system further restores the first GPU from the low-power state by concurrently restoring the interface configuration state from the memory during restoring of the GPU configuration state from the video memory.

In some embodiments, switching from using the first GPU to using the second GPU to drive the display involves copying pixel values from a first framebuffer for the first GPU to a second framebuffer for the second GPU, and initiating a switch from the first framebuffer to the second framebuffer as a signal source for driving the display.

In some embodiments, the first GPU is a high-power GPU which resides on a discrete GPU chip, and the second GPU is a low-power GPU which is integrated into a processor chipset.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
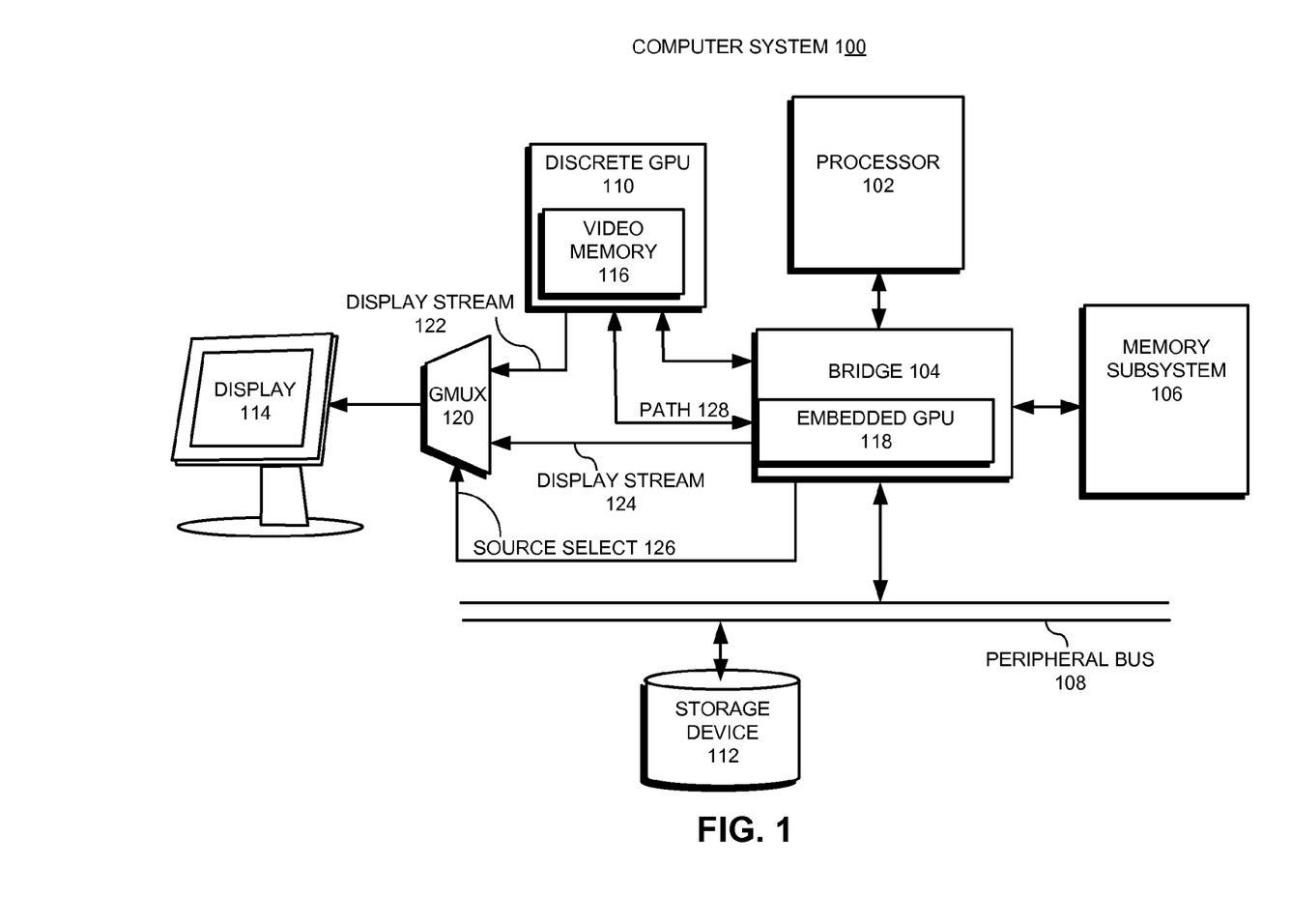
FIG. 1 illustrates a computer system which can switch between different graphics sources to drive the same display in accordance with the disclosed embodiments.

FIG. 1 illustrates a computer system 100 in accordance with the disclosed embodiments. Computer system 100 may correspond to a personal computer, laptop computer, portable electronic device, workstation, and/or other electronic device that can switch between two graphics sources to drive a display. Referring to FIG. 1, the two graphics sources include (1) a discrete graphics-processing unit (GPU) 110 and (2) an embedded GPU 118, each of which can independently drive display 114. The graphics source driving display 114 is determined by GPU multiplexer (GMUX) 120, which selects between GPU 110 and GPU 118. Hence, computer system 100 may use GMUX 120 to select a graphics source based on current operating conditions.

During operation, display stream 122 from discrete GPU 110 and display stream 124 from embedded GPU 118 both feed into data inputs of GMUX 120. Source select signal 126 feeds into a select input of GMUX 120 and determines which one of the two graphics sources will drive display 114. In the illustrated embodiment, source select signal 126 is produced by bridge chip 104, which includes specific logic for generating source select signal 126. (Note that source select signal 126 can also be produced by a logic block other than bridge chip 104.) The display stream from the selected graphics source then feeds into display 114.

In one embodiment, discrete GPU 110 and embedded GPU 118 communicate through data path 128 to synchronize their display streams. Note that synchronizing the display streams involves synchronizing both the respective timing signals and the respective data signals.

In one embodiment, discrete GPU 110 is a high-performance GPU that consumes a significant amount of power, whereas embedded GPU 118 is a lower-performance GPU that consumes a smaller amount of power. In this embodiment, when the graphics-processing load is light, computer system 100 switches from using discrete GPU 110 to using embedded GPU 118 to drive display 114, and subsequently powers down discrete GPU 110, thereby saving power. On the other hand, when the graphics-processing load becomes heavy again, computer system 100 switches graphics sources from embedded GPU 118 back to discrete GPU 110. As a result, the rendering and display of graphics in computer system 100 may involve a tradeoff between performance and power savings.

For example, computer system 100 may begin by using embedded GPU 118 as the signal source for driving display 114 until an event associated with a dependency on discrete GPU 110 is detected through a graphical application programming interface (API) associated with a graphics library, video playback, and/or a window manager. The event may correspond to the use of a graphics library in computer system 100, playback of hardware decodable content, and/or initialization of an application (e.g., a computer game) with a dependency on discrete GPU 110. In response to the event, computer system 100 may switch from embedded GPU 118 to discrete GPU 110 as the signal source for driving display 114. During the switch, threads that depend on discrete GPU 110 may be blocked until discrete GPU 110 is fully driving display 114. A switch back to embedded GPU 118 as the signal source may be made after all dependencies on discrete GPU 110 are removed (e.g., after video playback of hardware decodable content, use of graphics libraries, and/or execution of applications associated with discrete GPU 110 are complete).

Although we have described a system that includes a discrete GPU and an embedded GPU, the disclosed technique can generally work in any computer system comprising two or more GPUs, each of which may independently drive display 114. Moreover, GPUs in the same computer system may have different operating characteristics, such as power-consumption levels. For example, the computer system may switch between a general-purpose processor 102 (e.g., central processing unit (CPU)) and a special-purpose GPU (e.g., discrete GPU 110) to drive display 114. Hence, the disclosed technique is not limited to the specific embodiment illustrated in FIG. 1.

Also note that the above-described process for switching between graphics sources does not involve shutting down or reinitializing the computer system. As a result, the switching process can take substantially less time than it would have if a re-initialization had been required. Consequently, the disclosed technique facilitates rapid and frequent switching between the graphics sources.

In one or more embodiments, computer system 100 includes functionality to reduce power consumption, for example during idle states of discrete GPU 110. Such idle states may occur when executing applications have dependencies on discrete GPU 110 but such applications have not made graphics calls to update display 114 using discrete GPU 110. For example, discrete GPU 110 may enter an idle state after the graphical content of display 114 has not been updated by discrete GPU 110 for a pre-specified length of time (e.g., number of frames, milliseconds, etc.).

Once an idle state is detected in discrete GPU 110, a switch is made from using discrete GPU 110 to using embedded GPU 118 to drive display 114, and discrete GPU 110 is placed into a low-power state. To make the switch, pixel values may be copied from a first framebuffer for discrete GPU 110 to a second framebuffer for embedded GPU 118, and a switch may be initiated from the first framebuffer to the second framebuffer as the signal source for driving display 114.

Prior to placing discrete GPU 110 into the low-power state, a GPU configuration state of discrete GPU 110 is saved in video memory 116 of discrete GPU 110, and an interface configuration state of an interface with discrete GPU 110 is saved in memory 106 on computer system 100. To place discrete GPU 110 into a low-power state, discrete GPU 110 and the interface are powered off, and power to video memory 116 is maintained. Because only video memory 116 in discrete GPU 110 is powered in the low-power state, the low-power state may reduce the power consumption of the computer system. For example, 1-3 watts of power may be required to keep discrete GPU 110 in a powered-on, idle state, while only 200 milliwatts may be needed to provide power to video memory 116.

During the low-power state, applications with dependencies on discrete GPU 110 are not transferred to embedded GPU 118. Instead, graphics calls from the applications to discrete GPU 110 may be intercepted by a shim. The shim may acquire a lock for the first graphics call to discrete GPU 110 and queue the first graphics call and subsequent graphics calls to discrete GPU 110. Once graphics calls to discrete GPU 110 are received by the shim, driving of display 114 by discrete GPU 110 may possibly resume. In particular, discrete GPU 110 may be restored from the low-power state, a switch may be made from using embedded GPU 118 to using discrete GPU 110 to drive display 114, and intercepted graphics calls may be directed to discrete GPU 110. Furthermore, restoration of discrete GPU 110 from the low-power state may be accelerated by restoring the GPU configuration state of discrete GPU 110 from video memory 116 and concurrently restoring the interface configuration state of the interface with discrete GPU 110 from memory 106. Driving of displays during idle states of high-power GPUs and restoration of GPUs from low-power states are discussed in further detail below with respect to FIGS. 3-4.

Figure 2:
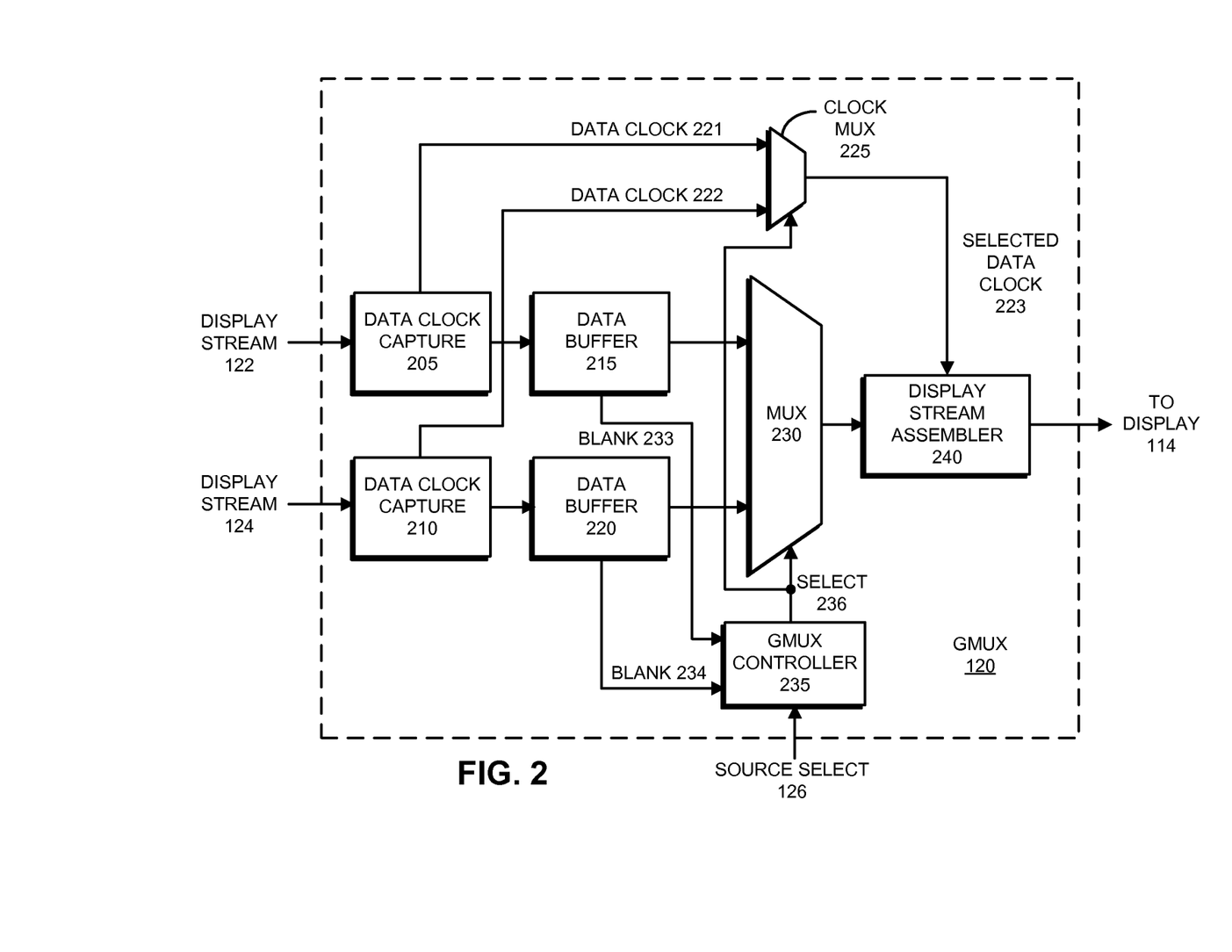
FIG. 2 illustrates the structure of a graphics multiplexer in accordance with the disclosed embodiments.

FIG. 2 illustrates the internal structure of graphics multiplexer 120 (described above with reference to FIG. 1) in accordance with the disclosed embodiments. Referring to FIG. 2, display stream 122 from discrete GPU 110 and display stream 124 from embedded GPU 118 feed into data clock capture blocks 205 and 210, respectively. Data clock capture blocks 205 and 210 de-serialize display streams 122 and 124 and also extract respective data clock signals 221 and 222.

These data clock signals 221 and 222 feed into clock MUX 225, which selects one of data clock signals 221 and 222 to be forwarded to display stream assembler 240. In one embodiment, GMUX controller 235 provides select signal 236 to clock MUX 225. Alternatively, select signal 236 can be provided by other sources, such as processor 102 or another controller.

Next, display streams 122 and 124, with data clocks separated, feed into data buffers 215 and 220, respectively. Data buffers 215 and 220 examine display streams 122 and 124 to determine when blanking intervals occur, and produce respective blanking interval signals 233 and 234. Data buffers 215 and 220 also produce output data streams that feed into data MUX 230.

Blanking interval signals 233 and 234 feed into GMUX controller 235, which compares blanking intervals 233 and 234 to determine how much overlap, if any, exists between the blanking intervals of display streams 122 and 124. (Note that blanking interval signals 233 and 234 can indicate vertical or horizontal blanking intervals.) If GMUX controller 235 determines that blanking intervals 233 and 234 have a sufficient amount of overlap, GMUX controller 235 asserts select signal 236 as the blanking intervals begin to overlap. This causes clock MUX 225 and data MUX 230 to switch between display streams 122 and 124 during the period when their blanking intervals overlap. Because the switching occurs during the blanking intervals, the switching process will not be visible on display 114.

Finally, the output of data MUX 230 and the selected data clock 223 feed into display stream assembler 240, which re-serializes the data stream before sending the data stream to display 114.

Figure 3:
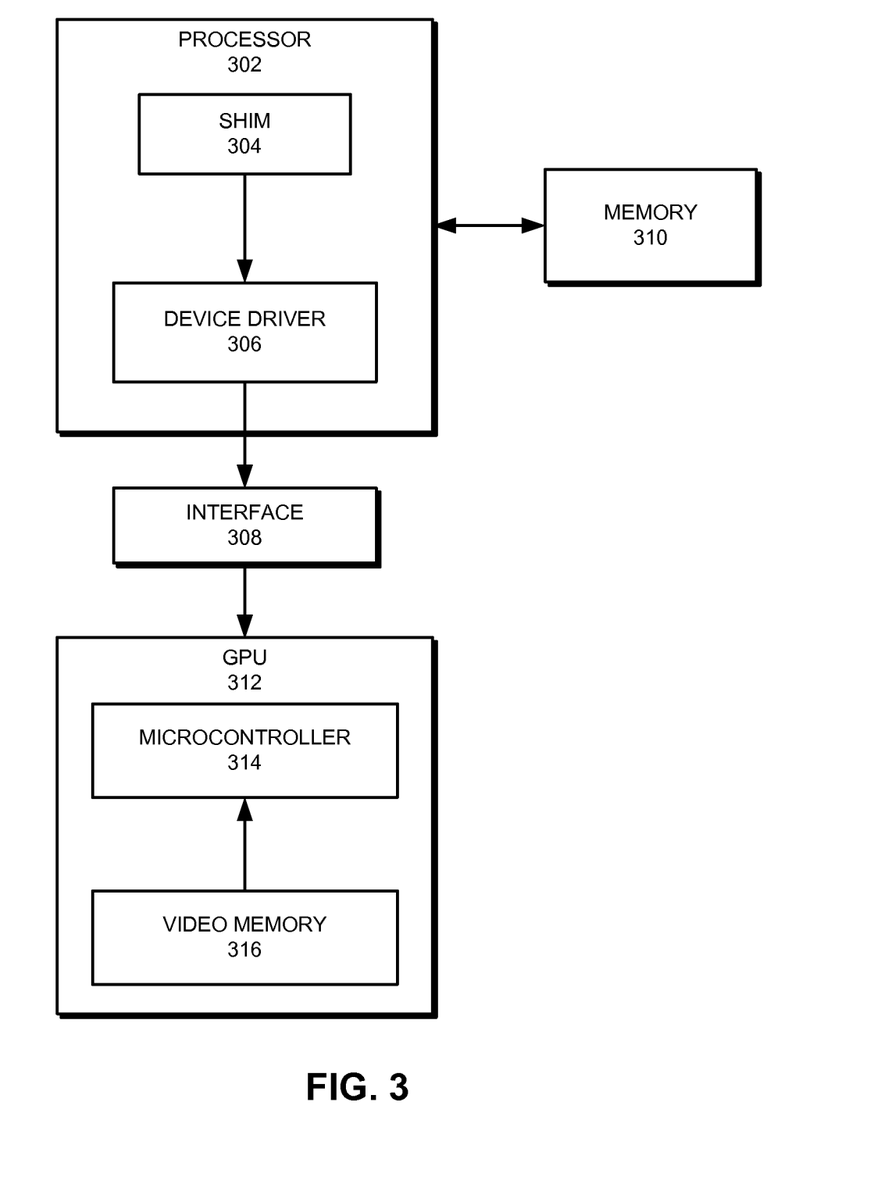
FIG. 3 shows a system for configuring a graphics-processing unit (GPU) in a computer system in accordance with the disclosed embodiments.

FIG. 3 shows a system for configuring a GPU 312 in a computer system (e.g., computer system 100 of FIG. 1) in accordance with the disclosed embodiments. GPU 312 may correspond to a high-power, discrete GPU that is connected to a processor 302 in the computer system through an interface 308 such as a Peripheral Component Interconnect Express (PCIe) interface. As mentioned above, GPU 312 may be placed into a low-power state to reduce power consumption in the computer system. For example, GPU 312 may be placed into a low-power state after an idle state of GPU 312 is detected and restored from the low-power state after a graphics call to GPU 312 is received.

Prior to placing GPU 312 into the low-power state, a device driver 306 executing on processor 302 may configure GPU 312 to save the GPU configuration state of GPU 312 on video memory 316 of GPU 312. The GPU configuration state may include mode settings for GPU 312, characteristics of one or more displays driven by GPU 312, and/or other information related to the configuration of GPU 312 within the computer system. Processor 302 may additionally save an interface configuration state of interface 308 in memory 310 on the computer system. For example, processor 302 may save the PCI configuration space of a PCIe device corresponding to GPU 312 in memory 310 before GPU 312 is placed into the low-power state.

Next, GPU 312 may be placed into the low-power state by powering off GPU 312 and interface 308 and maintaining power to video memory 316. During the low-power state, a shim 304 may be inserted to intercept graphics calls to device driver 306 and/or GPU 312. For example, shim 304 may acquire a lock for the first graphics call to GPU 312 and queue the first graphics call and subsequent graphics calls to GPU 312.

Furthermore, the receipt of a graphics call by shim 304 may trigger the restoration of GPU 312 from the low-power state to enable processing of the graphics call by GPU 312. For example, shim 304 may intercept a graphics call to GPU 312 related to the updating of a cursor, window, and/or desktop in the user interface of the computer system.

To initiate the restoration of GPU 312 from the low-power state, processor 302 may communicate with a microcontroller 314 associated with GPU 312. For example, processor 302 may transmit a signal to microcontroller 314 through a General Purpose Input/Output (GPIO) port monitored by microcontroller 314. Next, microcontroller 314 may restore the GPU configuration state of GPU 312 from video memory 316 while processor 302 concurrently restores the interface configuration state of interface 308 from memory 310. Once GPU 312 is restored, graphics calls intercepted (e.g., queued) by shim 304 may be directed to GPU 312 through device driver 306, and shim 304 may be removed.

Such restoration of GPU 312 from the low-power state may be significantly faster than restoration of GPU 312 from a fully powered-off state. In particular, conventional powering up of GPU 312 from a fully powered-off state (e.g., when switching from using an embedded GPU to using GPU 312 to drive a display) may begin with the restoration of interface 308, followed by the restoration of GPU 312. First, processor 302 may reestablish interface 308 by rebuilding the interface configuration state of interface 308, which may take 16-20 milliseconds. Next, driver 306 may use the reestablished interface 308 to initiate the restoration of GPU 312, which may require another 10-20 milliseconds. During restoration of GPU 312, up to 2 Gbytes of resources used by GPU 312 may be transferred from memory 310 over interface 308 to video memory 316 because data in video memory 316 does not persist if GPU 312 is completely powered off. Because data transfer over interface 308 is relatively slow, GPU 312 may not be restored from the fully powered-off state for up to 250 milliseconds.

On the other hand, GPU 312 may be restored from the low-power state by concurrently restoring the GPU and interface configuration states from video memory 316 and memory 310, respectively, instead of sequentially rebuilding the configuration states. The transfer of GPU 312 resources from memory 310 to video memory 316 may also be omitted since the resources are persisted on video memory 316 during the low-power state. As a result, restoration of GPU 312 from the low-power state may be completed in 30-50 milliseconds instead of hundreds of milliseconds.

The accelerated restoration of GPU 312 may further facilitate a reduction in the power consumption of the computer system without impacting the graphics performance of the computer system. For example, GPU 312 may be placed into the low-power state whenever GPU 312 is detected to be in an idle state. During the low-power state, a low-power, embedded GPU may be used to drive a display connected to the computer system instead of GPU 312, thus reducing the power consumption of the computer system by 1-2 watts. Once graphics calls to GPU 312 are received, efficient restoration of GPU 312 from the low-power state may allow GPU 312 to begin processing the graphics calls after an imperceptible delay. Consequently, the system of FIG. 3 may provide the power savings associated with a self-refreshing panel in a computer system that is not connected to a self-refreshing panel.

Figure 4:
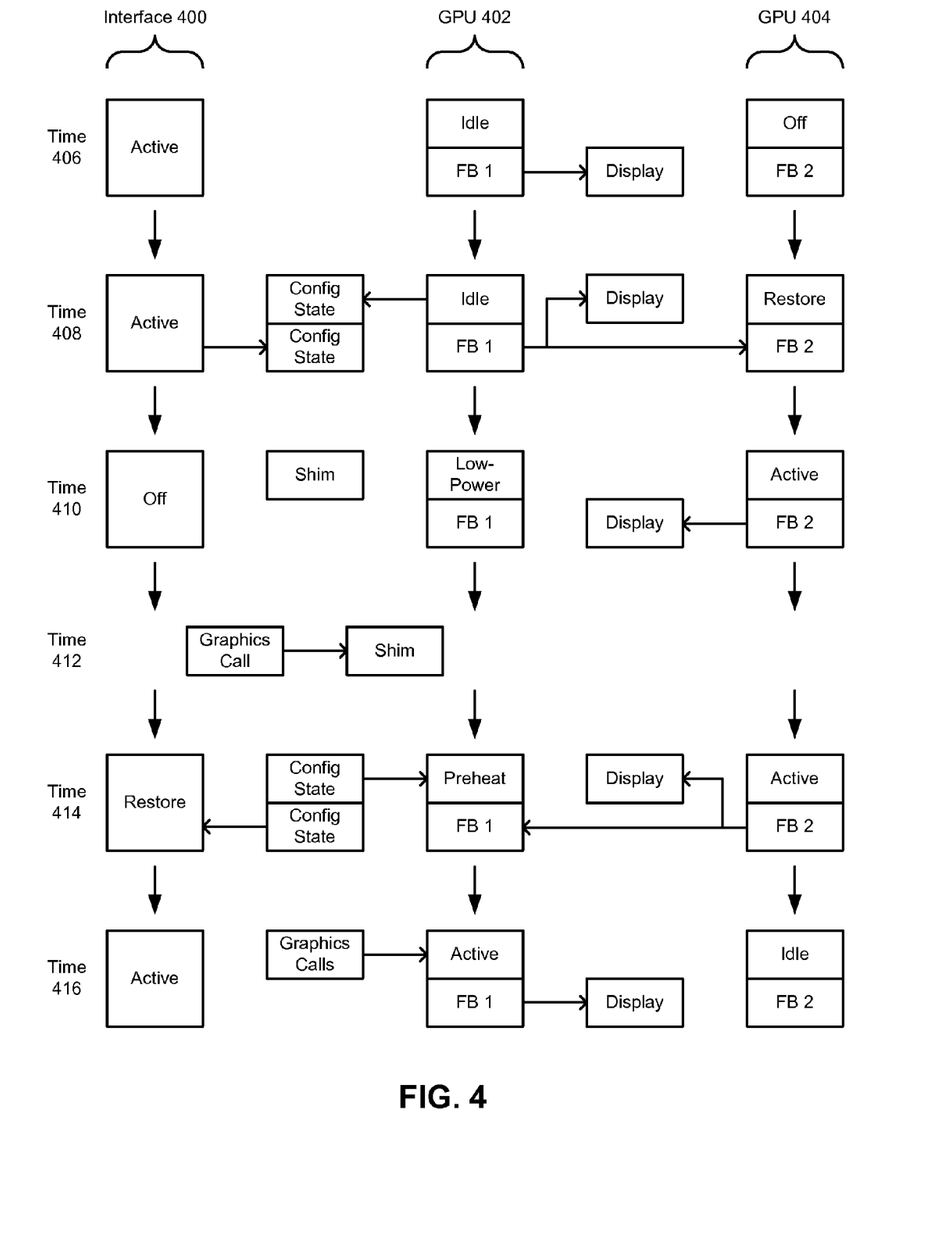
FIG. 4 shows a timeline of operations involved in switching between graphics-processing units (GPUs) in a computer system in accordance with the disclosed embodiments.

FIG. 4 shows a timeline of operations involved in switching between graphics-processing units (GPUs) in a computer system (e.g., computer system 100 of FIG. 1) in accordance with the disclosed embodiments. More specifically, FIG. 4 shows a set of operations associated with two GPUs 402-404 and an interface 400 as the operations are performed over a sequence of times 406-416. GPU 402 may correspond to a high-power and/or discrete GPU, GPU 404 may correspond to a low-power and/or embedded GPU, and interface 400 may connect GPU 402 to the computer system.

Initially, at time 406, interface 400 is active, GPU 402 is idle, and GPU 404 is off. In addition, a first framebuffer (e.g., "FB 1") for GPU 402 is used to drive the display, while a second framebuffer (e.g., "FB 2") for GPU 404 is not connected to the display. For example, data in the first framebuffer may be pulled by a pipe at the refresh rate of the display and sent to the display to modify the graphical output of the display.

Once a decision is made to disable GPU 402 (e.g., an idle state for GPU 402 is detected), a switch is made from using GPU 402 to using GPU 404 to drive the display. At time 408, GPUs 402-404 and interface 400 are prepared for the switch. More specifically, a GPU configuration state of GPU 402 is saved to video memory of GPU 402, and an interface configuration state of interface 400 is saved to memory on the computer system. GPU 404 may also be restored from the powered-off state by powering up GPU 404, reinitializing device drivers for GPU 404, determining characteristics of the display, and/or copying configuration information (e.g., mode settings, color lookup table (CLUT), etc.) from GPU 402 to GPU 404. After configuration (e.g., restoration) of GPU 404 is complete, pixel values may be copied from the first framebuffer to the second framebuffer.

At time 410, a switch is initiated from the first framebuffer to the second framebuffer as the signal source for driving the display, and GPU 402 is placed into a low-power state. During the low-power state, GPU 402 and interface 400 are powered off while power to video memory of GPU 402 is maintained.

In addition, a shim may be inserted to intercept graphics calls to GPU 402. For example, the shim may intercept graphics calls to GPU 402 by acquiring a lock for the first graphics call to GPU 402 and queuing the first and subsequent graphics calls to GPU 402.

At time 412, a graphics call to GPU 402 is received by the shim. To enable processing of the graphics call by GPU 402, GPU 402 may be restored from the low-power state at time 414. As with restoration of GPU 404, restoration of GPU 402 may include powering up of GPU 402 and reinitializing device drivers for GPU 402. Furthermore, the restoration of GPU 402 may be accelerated by concurrently restoring the GPU and interface configuration states from video memory and memory on the computer system, respectively, and omitting the transfer of resources for GPU 402 from the memory to the video memory (e.g., because the resources are persisted on the video memory during the low-power state). Note that after GPU 402 is restored, valid pixel values should exist in the first framebuffer in GPU 402.

Finally, at time 416, a switch is made from using GPU 404 to using GPU 402 to drive the display. Graphics calls queued by the shim are also directed to GPU 402 via interface 400, and the shim is removed. In other words, the operations associated with times 406-416 may switch from using GPU 402 to using GPU 404 to drive the display whenever GPU 402 is detected to be in an idle state. The operations may also place GPU 402 in a low-power state during the idle state. Finally, the operations may expedite the restoration of GPU 402 from the low-power state after graphics calls are intercepted by the shim during the low-powerlow-power state. Consequently, the operations may reduce the power consumption of the computer system without producing a perceptible effect on the graphics performance of the computer system.

Figure 5:
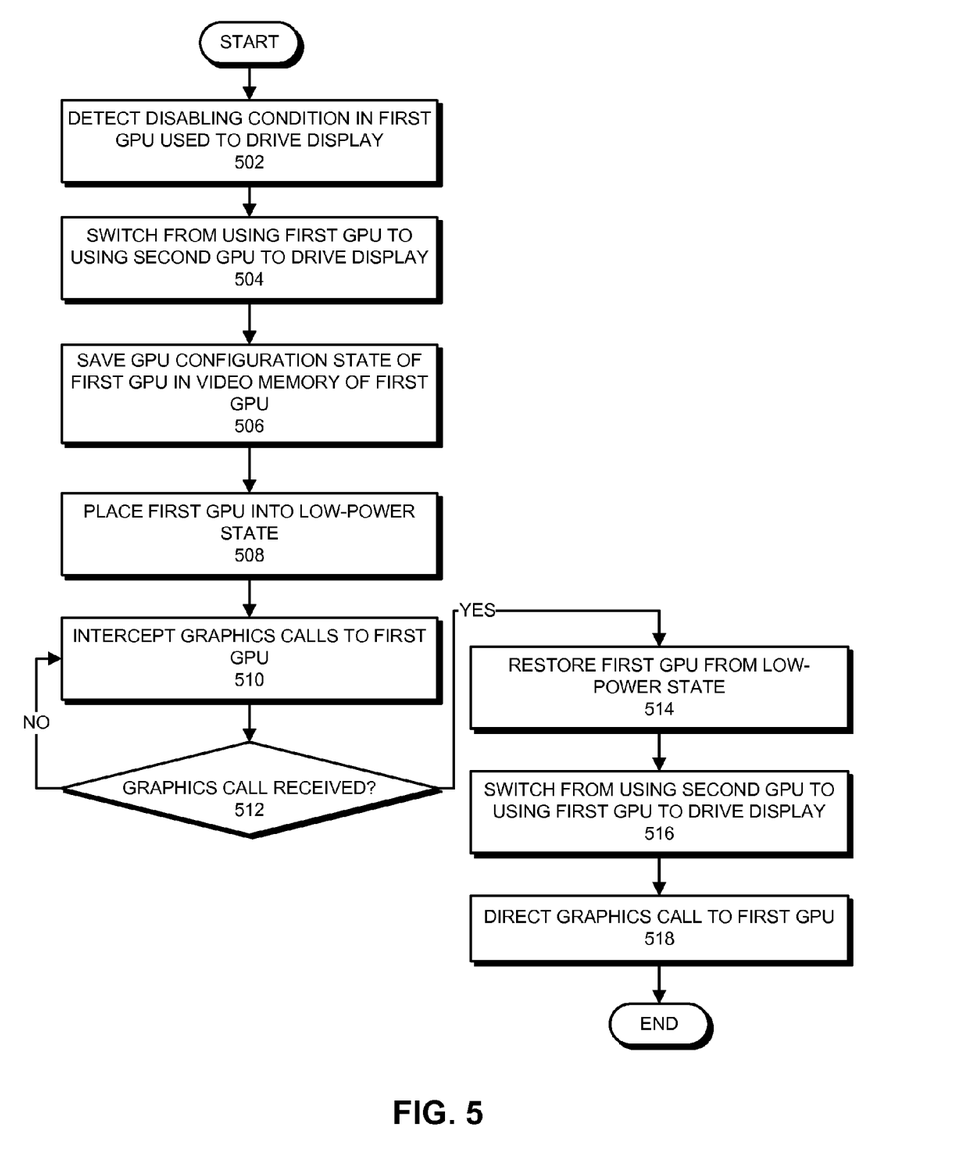
FIG. 5 shows a flowchart illustrating the process of driving a display from a computer system in accordance with the disclosed embodiments.

FIG. 5 shows a flowchart illustrating the process of driving a display from a computer system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a disabling condition (e.g., an idle state) is detected in a first GPU used to drive the display, wherein the disabling condition causes the first GPU to be disabled (operation 502). For example, the disabling condition can be an idle state which may be detected after the GPU has not processed graphics calls and/or updated the contents of the display for a number of frames and/or a length of time. Next, a switch from using the first GPU to using a second GPU to drive the display is made (operation 504). The second GPU may correspond to a low-power (e.g., embedded) GPU, while the first GPU may correspond to a high-power (e.g., discrete) GPU. To make the switch, pixel values may be copied from a first framebuffer for the first GPU to a second framebuffer for the second GPU, and a switch may be initiated from the first framebuffer to the second framebuffer as a signal source for driving the display.

In addition, the GPU configuration state of the first GPU is saved in video memory of the first GPU (operation 506), the first GPU is placed into a low-power state (operation 508), and graphics calls to the first GPU are intercepted (operation 510). To place the first GPU into the low-power state, the first GPU and an interface with the first GPU are powered off, and power to video memory of the first GPU is maintained. The shim may then intercept graphics calls by acquiring a lock for the first graphics call to the GPU and queuing the first graphics call and subsequent graphics calls to the first GPU. (In some embodiments, the shim is inserted above the driver to reduce the amount of driver hardening that is required. In this way, the shim may acquire relevant locks to help avoid having the driver touch powered-down hardware. This makes it possible to prevent calls from reaching the driver to avoid having to harden drivers as much. Note that the drivers could alternatively be hardened to themselves to achieve the same effect.)

While the first GPU is in the low-power state, the display is driven by the second GPU. As a result, the low-power state may reduce a power consumption of the computer system. The first GPU may remain in the low-power state, and graphics calls to the first GPU may be intercepted (operation 510) until a graphics call to the first GPU is received (operation 512). Upon receiving the graphics call, the first GPU may possibly be restored from the low-power state (operation 514). Restoration of GPUs from low-power states is discussed in further detail below with respect to FIG. 6.

Next, a switch from using the second GPU to using the first GPU to drive the display is made (operation 516). For example, pixel values may be copied from the second framebuffer to the first framebuffer, and a switch may be initiated from the second framebuffer to the first framebuffer as a signal source for driving the display. Finally, the graphics call is directed to the first GPU (operation 518) to enable processing of the graphics call by the first GPU.

Figure 6:
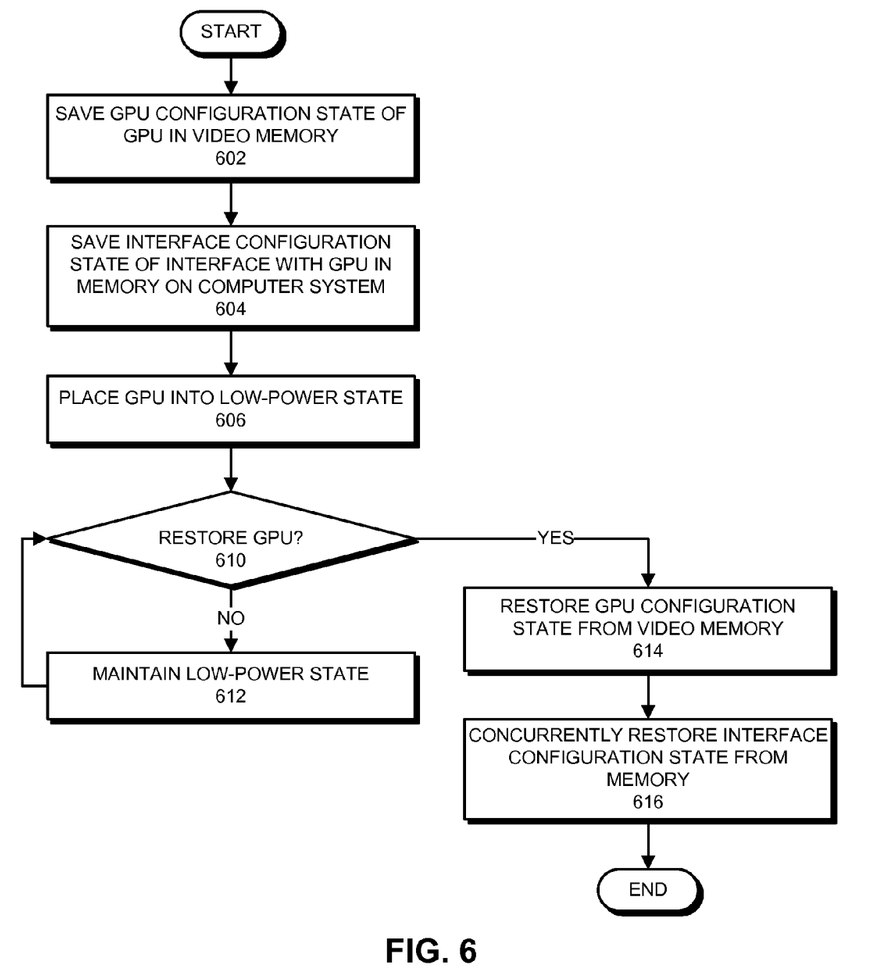
FIG. 6 shows a flowchart illustrating the process of configuring a GPU in a computer system in accordance with the disclosed embodiments.

FIG. 6 shows a flowchart illustrating the process of configuring a GPU in a computer system in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a GPU configuration state of the GPU is saved in video memory of the GPU (operation 602), and an interface configuration state of an interface with the GPU is saved in memory on the computer system (operation 604). Next, the GPU is placed into a low-power state (operation 606) by powering off the GPU and interface and maintaining power to the video memory.

The GPU may be restored (operation 510) from the low-power state. For example, the GPU may be placed into the low-power state upon detecting an idle state of the GPU and restored from the low-power state upon receiving a graphics call to the GPU. Prior to restoration of the GPU, the low-power state is maintained (operation 612).

To restore the GPU from the low-power state, the GPU configuration state is restored from the video memory (operation 614), and the interface configuration state is concurrently restored from the memory (operation 616). Furthermore, resources used by the GPU may be persisted on the video memory during the low-power state, thus allowing the GPU to be restored from the low-power state without transferring the resources from the memory to the video memory. As a result, restoration of the GPU from the low-power state may be significantly faster than restoration of the GPU from a fully powered-off state.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for driving a display from a computer system, comprising:
   detecting a disabling condition in a first graphics-processing unit (GPU) used to drive the display, wherein the disabling condition causes the first GPU to be disabled; and
   upon detecting the disabling condition:
      switching from using the first GPU to using a second GPU to drive the display; and
      placing the first GPU into a low-power state, wherein placing the first GPU into the low-power state involves powering off the first GPU and an interface with the first GPU, and maintaining power to video memory of the first GPU.

2. The method of claim 1, wherein the disabling condition is an idle state for the first GPU.

3. The method of claim 1, further comprising:
   during the low-power state, intercepting graphics calls to the first GPU; and
   if a graphics call to the first GPU is received:
      restoring the first GPU from the low-power state;
      switching from using the second GPU to using the first GPU to drive the display; and
      directing the graphics call to the first GPU.

4. The method of claim 3, wherein intercepting graphics calls to the first GPU involves:
   acquiring a lock for a first graphics call to the first GPU; and
   queuing the first graphics call and subsequent graphics calls to the first GPU.

5. The method of claim 3, further comprising:
   prior to placing the first GPU into the low-power state, saving a GPU configuration state of the first GPU in video memory of the first GPU,
   wherein restoring the first GPU from the low-power state involves restoring the GPU configuration state from the video memory.

6. The method of claim 1, wherein switching from using the first GPU to using the second GPU to drive the display involves:
   copying pixel values from a first framebuffer for the first GPU to a second framebuffer for the second GPU; and
   initiating a switch from the first framebuffer to the second framebuffer as a signal source for driving the display.

7. The method of claim 1,
   wherein the first GPU is a high-power GPU which resides on a discrete GPU chip, and
   wherein the second GPU is a low-power GPU which is integrated into a processor chipset.

8. A method for configuring a graphics-processing unit (GPU) in a computer system, comprising:
   prior to placing the GPU into a low-power state, saving a GPU configuration state of the GPU in video memory of the GPU;
   placing the GPU into the low-power state, wherein placing the GPU into the low-power state involves powering off the GPU and an interface with the GPU, and maintaining power to the video memory; and
   restoring the GPU from the low-power state by restoring the GPU configuration state from the video memory.

9. The method of claim 8, further comprising:
   prior to placing the GPU into the low-power state, saving an interface configuration state of the interface in memory on the computer system,
   wherein restoring the GPU from the low-power state further involves concurrently restoring the interface configuration state from the memory during restoring of the GPU configuration state from the video memory.

10. The method of claim 8, wherein the low-power state is associated with an idle state of the GPU.

11. The method of claim 8, wherein the GPU is restored from the low-power state upon receiving a graphics call to the GPU.

12. A computer system that switches from a first graphics processor to a second graphics processor to drive a display, comprising:
   a memory;
   a display;
   a first graphics-processing unit (GPU) comprising a video memory;
   a second GPU;
   a graphics multiplexer configured to couple either the first GPU or the second GPU to the display; and
   a power-management mechanism configured to:
      detect a disabling condition in the first GPU, wherein the disabling condition causes the first GPU to be disabled; and
      wherein upon detecting the disabling condition, the power-management mechanism configured to,
         switch from using the first GPU to using the second GPU to drive the display; and
      place the first GPU into a low-power state, wherein placing the first GPU into the low-power state involves powering off the first GPU and an interface with the first GPU, and maintaining power to video memory of the first GPU.

13. The computer system of claim 12, wherein the disabling condition is an idle state for the first GPU.

14. The computer system of claim 12, further comprising:
   a shim configured to intercept graphics calls to the first GPU during the low-power state,
   wherein if a graphics call to the first GPU is received by the shim, the power-management mechanism is further configured to:
      restore the first GPU from the low-power state;
      switch from using the second GPU to using the first GPU to drive the display; and
      direct the graphics call to the first GPU.

15. The computer system of claim 14, wherein intercepting graphics calls to the first GPU during the idle state involves:
   acquiring a lock for a first graphics call to the first GPU; and
   queuing the first graphics call and subsequent graphics calls to the first GPU.

16. The computer system of claim 14, further comprising:
   a device driver configured to save a GPU configuration state of the first GPU in the video memory prior to placing the first GPU into the low-power state; and
   a microcontroller configured to restore the GPU configuration state from the video memory during restoring of the first GPU from the low-power state.

17. The computer system of claim 16, further comprising:
   a processor configured to:
      save an interface configuration state of an interface with the first GPU in the memory; and
      concurrently restore the interface configuration state from the memory during restoring of the GPU configuration state from the video memory.

18. The computer system of claim 12, wherein switching from using the first GPU to using the second GPU to drive the display involves:
   copying pixel values from a first framebuffer for the first GPU to a second framebuffer for the second GPU; and
   initiating a switch from the first framebuffer to the second framebuffer as a signal source for driving the display.

19. The computer system of claim 12,
   wherein the first GPU is a high-power GPU which resides on a discrete GPU chip, and
   wherein the second GPU is a low-power GPU which is integrated into a processor chipset.

20. A non-transitory computer-readable storage medium storing instructions that when executed by a computer cause the computer to perform a method for driving a display from a computer system, the method comprising:
   detecting an disabling condition in a first graphics-processing unit (GPU) used to drive the display, wherein the disabling condition causes the first GPU to be disabled; and
   upon detecting the disabling condition:
      switching from using the first GPU to using a second GPU to drive the display; and
      placing the first GPU into a low-power state, wherein placing the first GPU into the low-power state involves powering off the first GPU and an interface with the first GPU, and maintaining power to video memory of the first GPU.

21. The computer-readable storage medium of claim 20, wherein the disabling condition is an idle state for the first GPU.

22. The computer-readable storage medium of claim 20, the method further comprising:
   during the low-power state, intercepting graphics calls to the first GPU; and
   if a graphics call to the first GPU is received:
      restoring the first GPU from the low-power state;
      switching from using the second GPU to using the first GPU to drive the display; and
      directing the graphics call to the first GPU.

23. The computer-readable storage medium of claim 22, wherein intercepting graphics calls to the first GPU involves:
   acquiring a lock for a first graphics call to the first GPU; and
   queuing the first graphics call and subsequent graphics calls to the first GPU.

24. The computer-readable storage medium of claim 22, the method further comprising:
   prior to placing the first GPU into the low-power state, saving a GPU configuration state of the first GPU in video memory of the first GPU,
   wherein restoring the first GPU from the low-power state involves restoring the GPU configuration state from the video memory.

25. The computer-readable storage medium of claim 20, wherein switching from using the first GPU to using the second GPU to drive the display involves:
   copying pixel values from a first framebuffer for the first GPU to a second framebuffer for the second GPU; and
   initiating a switch from the first framebuffer to the second framebuffer as a signal source for driving the display.

* * * * *